G. T. TOMPKINS.
VEHICLE SIGNAL.
APPLICATION FILED JUNE 4, 1919.
1,435,093.
Patented Nov. 7, 1922.
2 SHEETS—SHEET 1.
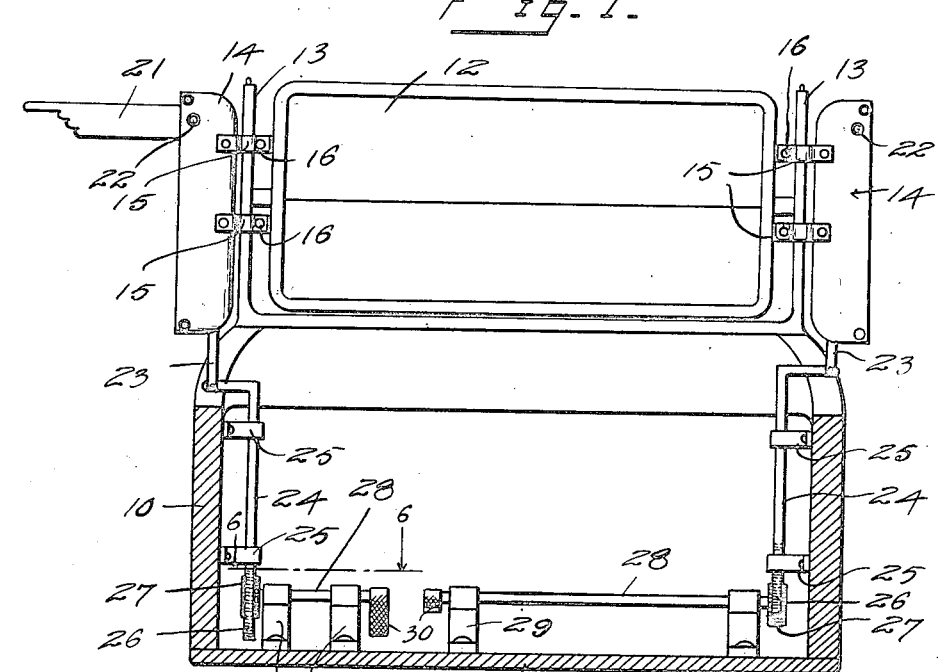
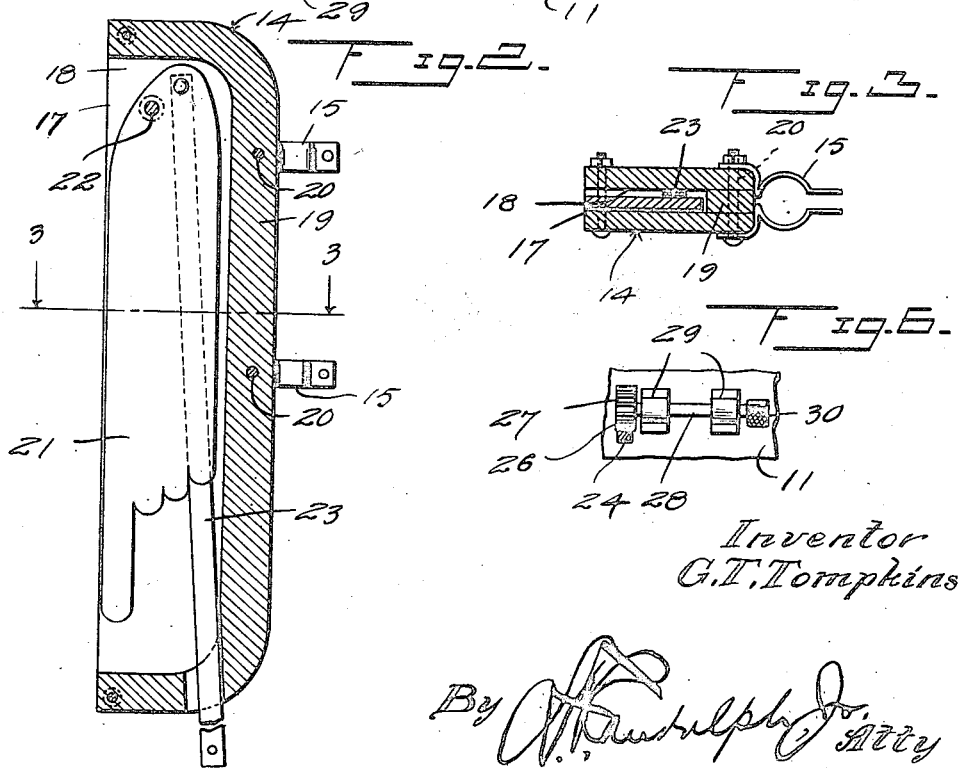
Inventor
G. T. Tompkins

G. T. TOMPKINS.
VEHICLE SIGNAL.
APPLICATION FILED JUNE 4, 1919.

1,435,093.

Patented Nov. 7, 1922.
2 SHEETS—SHEET 2.

Inventor
G. T. Tompkins

Patented Nov. 7, 1922.

1,435,093

UNITED STATES PATENT OFFICE.

GEORGE T. TOMPKINS, OF GREENSBURG, PENNSYLVANIA.

VEHICLE SIGNAL.

Application filed June 4, 1919. Serial No. 301,661.

*To all whom it may concern:*

Be it known that I, GEORGE T. TOMPKINS, a citizen of the United States, residing at Greensburg, in the county of Westmoreland and State of Pennsylvania, have invented certain new and useful Improvements in Vehicle Signals; and I do hereby declare the following to be a full, clear, and exact description of the invention, such as will enable others skilled in the art to which it appertains to make and use the same.

My invention relates to improvements in vehicle signals of the visual type.

An important object of this invention is to provide a signal of the character described which may be readily and conveniently attached to a vehicle for advising pedestrians and the operators of other nearby vehicles of the intended direction of the vehicle bearing the signal.

A further object of the invention is to provide a signal of the character described whch may be operated either by mechanical or electrical means.

Other objects and advantages of the invention will be apparent during the course of the following description.

Figure 4:
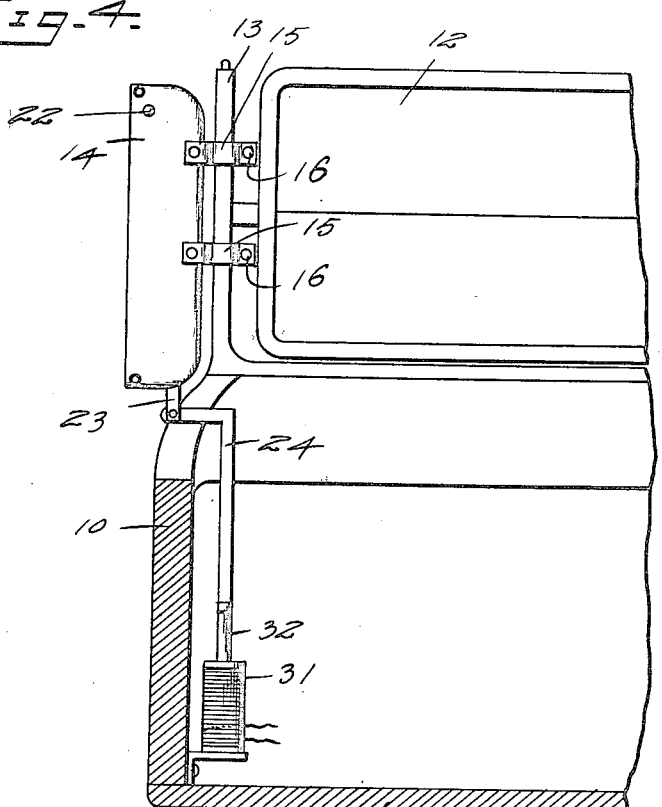
Figure 5:
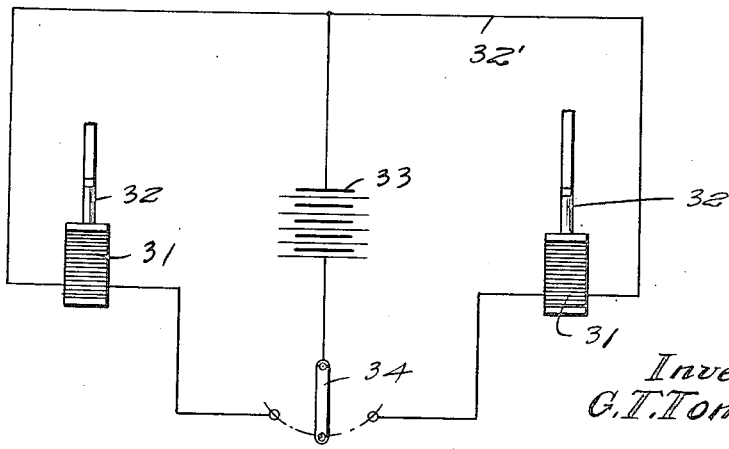

In the accompanying drawings forming a part of this application and in which like numerals are employed to designate like parts throughout the same, Figure 1 is a transverse section through a portion of a vehicle having my improved signal applied thereto, Figure 2 is a vertical section through the signal casing, Figure 3 is a horizontal section taken on line 3—3 of Figure 2, Figure 4 is a fragmentary transverse section through a vehicle having the signal attached thereto and provided with electric operating means, Figure 5 is a diagram of the wiring used in connection with the electric operating means for the signal, and, Figure 6 is a horizontal section taken on line 6—6 of Figure 1.

In the drawings wherein for the purpose of illustration is shown the preferred embodiments of my invention, the numeral 10 designates the body of a vehicle having the usual floor board 11. A wind shield 12 is carried by a pair of standards 13 secured to the upper side of the body as is usual.

For the purpose of illustration, I have elected to attach my improved signal casing 14 to the standards 13 by brackets 15. The brackets are secured to the standards by screw threaded bolts 16 or other suitable fastening means. As illustrated in Figure 1 a casing 14 is arranged on each side of the wind shield and may be viewed from the front and rear of the vehicle. As illustrated in Figure 2 the casing 14 is of elongated formation and has its outer vertical edge open as indicated at 17. The casing 14 includes a pair of parallel plates or side members 18 retained in spaced relation by an intermediate strip 19. Bolts 20 extend through the side plates 18 and the strip 19 and serve to connect the same. An indicator arm 21 is pivoted at 22 within each casing and is adapted to be swung to a horizontal position by an operating arm 23 pivoted to the upper portion of the indicator arm at one side of the longitudinal center of the same. The pivot element 22 is also arranged at one side of the longitudinal center of the indicator arm. As indicated in Figure 1 the vertically movable arm 23 is connected at its lower end to a vertically movable shaft 24 slidable within a bracket 25 carried by the inner side of the vehicle. The lower portion of the vertically slidable shaft 24 is provided with transverse gear teeth 26 engaged by a relatively small gear 27. The gear 27 is keyed on a shaft 28 secured to the floor board by bearings 29. A pedal 30 is arranged on each shaft 28 and is adapted for rotating the gear 27 for lowering the vertically slidable shaft 24.

As indicated in Figure 1, the signals on each side of the vehicle are operable independently of each other.

In the form of my invention illustrated in Figure 4 I have dispensed with the gear and rack connection and have provided a vertical solenoid 31. A solenoid core 32 is secured to the lower end of each shaft 24 and is adapted to be drawn into the solenoid 31 upon the solenoid receiving an electric charge. The solenoid is connected by a circuit 32′ to a source of electric energy 33. A double switch 34 is arranged for directing the current through either of the circuits of the two signals whereby the cores are supplied with electric energy from the same source.

While I have shown and described the preferred embodiment of my invention, it is understood that I may make such minor changes in arrangement and construction of parts as will remain within the spirit of the invention and the scope of the appended claim.

It will be noted that the housings which are provided for the pointer and are adapted for attachment to the ends of the wind shield, in effect constitute extensions of the wind shield, being arranged in the plane of and projecting beyond the extremities thereof at the sides of the vehicle and that the pointers when in their folded or normal position are entirely concealed in said housings and are protected against injury by contact with adjacent objects or on entering or leaving the car, and it is obvious that such housings may be made of an ornamental form or appearance serving to add to rather than detract from the appearance of the vehicle.

Having thus described my invention, what I claim is:—

A signal, a casing in which said signal is pivoted having a side opening through which said signal is adapted to be projected, an arm eccentrically pivoted to the signal, said arm projecting through and below an opening in the casing, a substantially vertically slidable rod for mounting within an automobile body, said rod at its upper end having a crank portion extending outwardly and over a side wall of the automobile body, said crank portion being pivoted to said arm and means operable to slide said rod.

In testimony whereof I affix my signature in presence of two witnesses.

GEORGE T. TOMPKINS.

Witnesses:
 EUGENE G. ALCORN,
 Mrs. J. J. HITCH.